(12) United States Patent
Chun et al.

(10) Patent No.: US 9,187,595 B2
(45) Date of Patent: Nov. 17, 2015

(54) METHOD FOR MANUFACTURING BIODEGRADABLE COPOLYMER BY SPLIT-INJECTING AROMATIC DICARBOXYLIC ACID COMPOUND

(71) Applicant: SAMSUNG FINE CHEMICALS CO., LTD, Ulsan (KR)

(72) Inventors: Jong Pil Chun, Daejeon (KR); Ye Jin Kim, Seoul (KR); Ki Chull Yun, Chungcheongnam-do (KR); Min Kyoung Kim, Seoul (KR)

(73) Assignee: SAMSUNG FINE CHEMICALS CO., LTD, Ulsan (KR)

( * ) Notice: Subject to any disclaimer, the term of this patent is extended or adjusted under 35 U.S.C. 154(b) by 0 days.

(21) Appl. No.: 14/402,516

(22) PCT Filed: May 13, 2013

(86) PCT No.: PCT/KR2013/004226
§ 371 (c)(1),
(2) Date: Nov. 20, 2014

(87) PCT Pub. No.: WO2014/021543
PCT Pub. Date: Feb. 6, 2014

(65) Prior Publication Data
US 2015/0152218 A1   Jun. 4, 2015

(30) Foreign Application Priority Data

Jul. 30, 2012 (KR) .......................... 10-2012-0083245

(51) Int. Cl.
C08G 63/16   (2006.01)
C08G 63/183  (2006.01)
C08G 63/12   (2006.01)
C08G 63/78   (2006.01)
C08G 63/52   (2006.01)

(52) U.S. Cl.
CPC .............. *C08G 63/183* (2013.01); *C08G 63/12* (2013.01); *C08G 63/78* (2013.01)

(58) Field of Classification Search
CPC ................................ C08G 63/16; C08G 63/46
USPC .......................... 528/193, 194, 196, 198, 302
See application file for complete search history.

(56) References Cited

U.S. PATENT DOCUMENTS

| 4,656,241 A * | 4/1987 | Iida et al. ...................... 528/279 |
| 2011/0039999 A1 * | 2/2011 | Witt et al. ..................... 524/210 |

FOREIGN PATENT DOCUMENTS

| KR | 2001-0057068 A | 7/2001 |
| KR | 10-2006-0071710 A | 6/2006 |
| KR | 10-0855683 A | 9/2008 |
| KR | 10-2011-0121796 A | 11/2011 |

OTHER PUBLICATIONS

International Search Report for corresponding International Application No. PCT/KR2013/004226, mailed Aug. 19, 2013 (2 pages).

* cited by examiner

*Primary Examiner* — Terressa Boykin
(74) *Attorney, Agent, or Firm* — Osha Liang LLP

(57) ABSTRACT

There is provided a method of preparation for a biodegradable co-polyester, the method including: forming an oligomer through a primary esterification reaction between a hydroxy group of an aliphatic dihydroxy compound and a carboxylic group of an aliphatic dicarboxylic acid compound; performing a secondary esterification reaction between the formed oligomer and an aromatic dicarboxylic acid compound; and performing a polycondensation reaction in a vacuum, in which sequentially divided addition of the aromatic dicarboxylic acid compound is performed and the weight ratio of the aromatic dicarboxylic acid compound with respect to the oligomer for each time of the sequentially divided addition is from 2:8 to 5:5. The method efficiently increases a solubility of aromatic dicarboxylic acid, thereby increasing a reaction rate and reducing a side reaction.

11 Claims, 2 Drawing Sheets

METHOD FOR MANUFACTURING BIODEGRADABLE COPOLYMER BY SPLIT-INJECTING AROMATIC DICARBOXYLIC ACID COMPOUND

CROSS-REFERENCE TO RELATED APPLICATION

This application claims priority to and the benefit of Korean Patent Application No. 2012-0083245, filed on Jul. 30, 2012, the disclosure of which is incorporated herein by reference in its entirety.

BACKGROUND

1. Field of the Invention

The present invention relates to a method of preparation for a biodegradable co-polyester with divided addition of an aromatic dicarboxylic acid compound, and more particularly, to a method of preparation for a biodegradable co-polyester in which an aliphatic dihydroxy compound and an aliphatic dicarboxylic acid compound are first esterificated to improve a solubility and reactivity of an aromatic dicarboxylic acid compound which is a reactant for a process of preparation for a biodegradable co-polyester, and then the aromatic dicarboxylic acid compound is dividedly added thereto, thereby increasing the solubility of the aromatic dicarboxylic acid compound and reducing a side reaction.

2. Discussion of Related Art

A biodegradable resin is a synthetic resin developed as a new material which is degraded into water and carbon dioxide or water by a microorganism, such as bacteria, algae, and fungi, existent in nature and does not cause environmental contamination.

The biodegradable resin widely used together with cellulose-based polymers and starches is a resin produced from aliphatic polyester such as polylactic acid (PLA), polybutylene succinate (PBS), polyethylene succinate (PES), and polycaprolactone (PCL).

Such an aliphatic polyester resin has a high biodegradability, but there is a disadvantage in that it has a low mechanical property. Therefore, in order to complement mechanical strength of the aliphatic polyester resin, there has been developed a method of preparing a biodegradable resin in the form of an aliphatic-aromatic copolymer through synthesis by adding an aromatic monomer to a process of producing a biodegradable resin.

At this time, as an aromatic monomer, dimethyl terephthalate (DMT) has been typically used. There is an advantage in that since the dimethyl terephthalate can react even at a reaction temperature of 200° C. or less, a reaction can be easily induced. However, there is a disadvantage in that the dimethyl terephthalate is expensive, thereby increasing cost burden.

Thus, there have been made continuous efforts to prepare a copolymer by using an aromatic monomer cheaper than the dimethyl terephthalate. By way of representative example, there has been suggested a method of using terephthalic acid (PTA) as aromatic dicarboxylic acid for a synthesis reaction of a copolymer.

However, unlike dimethyl terephthalate, terephthalic acid has no melting point and sublimates at a high temperature. Further, terephthalic acid is slightly dissolved in 1,4-butanediol (BDO), which is used as a representative aliphatic monomer for a process of preparing a biodegradable polyester resin, under normal pressure only at a temperature of 220° C. or more. Therefore, a reaction temperature of 220° C. or more is required to induce a uniform reaction between terephthalic acid and 1,4-butanediol. However, 1,4-butanediol is easily converted into tetrahydrofuran (THF) at a temperature of 200° C. under acidic conditions. Therefore, in a process of preparing a copolymer using an aromatic monomer such as terephthalic acid requiring a high reaction temperature and acidic reaction conditions, an excessive amount of an aliphatic monomer such as 1,4-butanediol needs to be used in consideration of an amount of the aliphatic monomer converted into tetrahydrofuran. In order to prevent waste of such an aliphatic dihydroxy compound, the aliphatic dihydroxy compound is allowed to react first with an aliphatic dicarboxylic acid compound having a relatively low acidity.

Poly(butylene adipate-co-terephthalate) (PBAT) is a representative biodegradable resin in the form of an aliphatic-aromatic copolymer prepared using terephthalic acid as an aromatic monomer and 1,4-butanediol and adipic acid as aliphatic monomers as described above.

However, as for PBAT, as depicted in FIG. 1, if an aromatic monomer such as terephthalic acid is directly added to a reaction of 1,4-butanediol and adipic acid, terephthalic acid is not completely dissolved due to its low solubility and a competitive reaction between an esterification reaction (1) and a cyclization reaction as a side reaction (for example, conversion (4) of 1,4-butanediol into THF) continues until the esterification reaction completes. Therefore, there is a disadvantage in that the esterification reaction is delayed and the side reaction is accelerated.

Accordingly, the present inventors have found that in a process of preparation for a biodegradable co-polyester, if an aliphatic dihydroxy compound and an aliphatic dicarboxylic acid compound are first esterificated and then an aromatic dicarboxylic acid compound is dividedly added thereto, a solubility of the aromatic dicarboxylic acid compound can be increased so as to reduce a side reaction without a delay in an esterification reaction and thus, completed the present invention.

SUMMARY OF THE INVENTION

The present invention is directed to providing a method of preparation for a biodegradable co-polyester, the method capable of efficiently increasing a solubility of an aromatic dicarboxylic acid compound and reducing a side reaction.

In order to achieve the above objects, according to an aspect of the present invention, there is provided a method of preparation for a biodegradable co-polyester, including: forming an oligomer through a primary esterification reaction between an aliphatic dihydroxy compound and an aliphatic dicarboxylic acid compound; performing a secondary esterification reaction between the formed oligomer and an aromatic dicarboxylic acid compound; and performing a polycondensation reaction in a vacuum, in which sequentially divided addition of the aromatic dicarboxylic acid compound is performed during the secondary esterification reaction and the weight ratio of the aromatic dicarboxylic acid compound with respect to the oligomer for each time of the sequentially divided addition is from 2:8 to 5:5.

Preferably, the sequentially divided addition may be two-time to six-time divided addition, and the aromatic dicarboxylic acid compound may preferably be added at the same ratio for each time of the sequentially divided addition.

Preferably, the aliphatic dihydroxy compound may be selected from the group consisting of 1,2-ethanediol, 1,3-propanediol, 1,2-butanediol, 1,6-hexanediol, 1,4-hexanediol, 1,4-butanediol, neopentyl glycol, isosorbide, and combinations thereof. Instead of the aliphatic dihydroxy compound, a cycloaliphatic dihydroxy compound selected from 1,4-cyclohexanediol or 1,4-cyclohexanedimethanol may be used.

Preferably, the aliphatic dicarboxylic acid compound may be a compound represented by the following Chemical Formula 1, or an anhydride or derivative thereof:

HOOC—(CH$_2$)$_n$—COOH    [Chemical Formula 1]

(where n is 2 to 12.)

Further, preferably, the aromatic dicarboxylic acid compound may include one or more kinds selected from the group consisting of phthalic acid (PA), phthalic anhydride, isophthalic acid (IPA), terephthalic acid (PTA), and naphthalene-2,6-dicarboxylic acid.

Furthermore, preferably, the primary esterification reaction may be performed first at a temperature ranging from 160° C. to 220° C. and the secondary esterification reaction may be performed in sequence at a temperature ranging from 210° C. to 260° C.

Moreover, preferably, in the method of preparation for the biodegradable co-polyester according to the present invention, the polycondensation reaction of an aliphatic-aromatic co-polyester obtained through the primary and secondary esterification reactions may be performed at a temperature ranging from 220° C. to 260° C. and a vacuum level of less than 2 torr for 40 minutes to 300 minutes.

Further, the method of preparation for the biodegradable co-polyester may further include adding and allowing a chain extender to react after the polycondensation reaction.

Furthermore, the method of preparation for the biodegradable co-polyester may further include adding and allowing a branching agent to react during the preparation for the biodegradable co-polyester.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
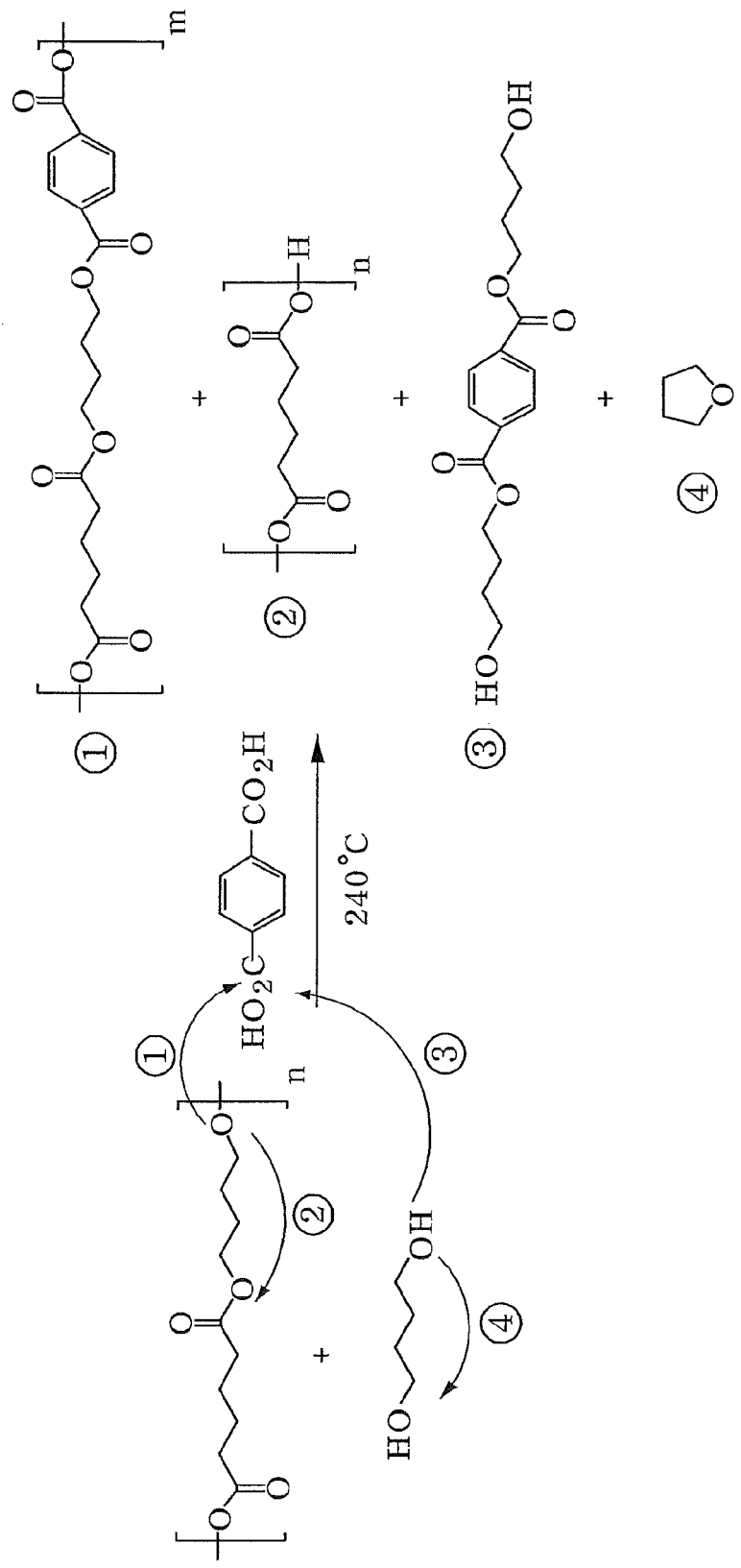
FIG. 1 is a reaction formula showing an esterification reactant and a side reactant obtained when 1,4-butanediol, adipic acid, and terephthalic acid are allowed to react to prepare poly(butylene adipate-co-terephthalate) (PBAT) as a biodegradable co-polyester.
Figure 2:
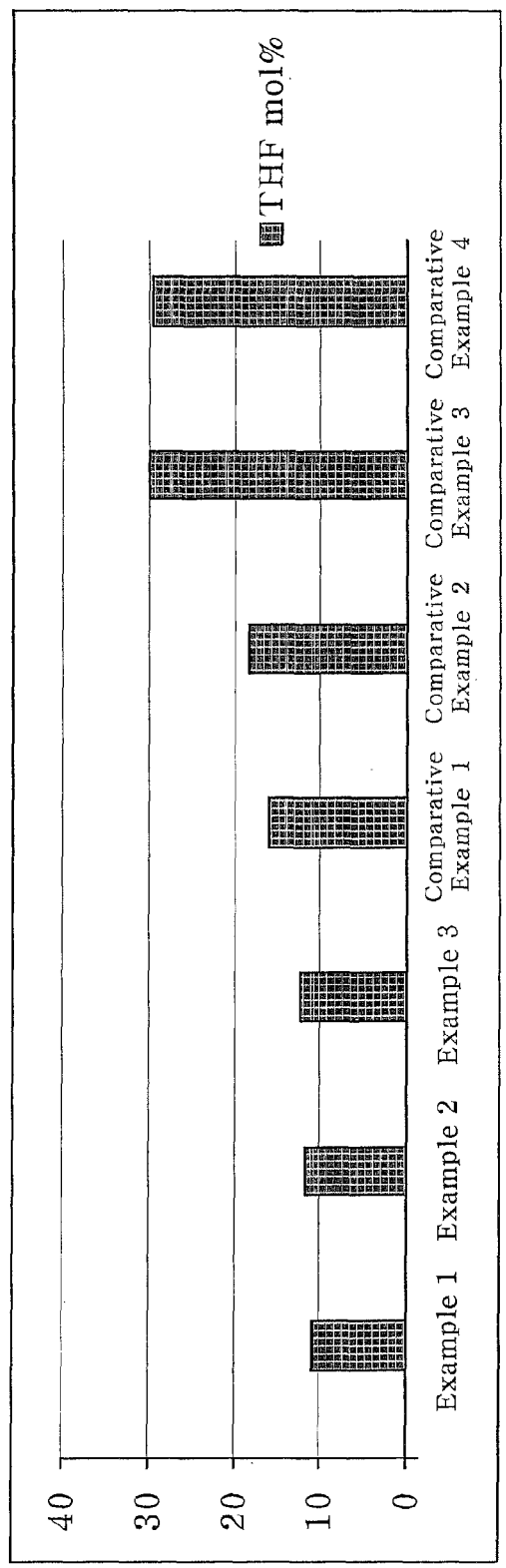
FIG. 2 is a graph analyzing THF conversion rates depending on total moles of the reaction according to the present invention and Comparative Examples.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention relates to a method of preparation for a biodegradable co-polyester in which an oligomer is first formed through an esterification reaction of an aliphatic dihydroxy compound and an aliphatic dicarboxylic acid compound and then an aromatic dicarboxylic acid compound is dividedly added thereto, so that the aromatic dicarboxylic acid compound is easily dissolved and then a side reaction is reduced without a delay in an esterification reaction.

The co-polyester is aliphatic-aromatic polyester obtained through a reaction of an aliphatic dihydroxy compound, an aliphatic dicarboxylic acid compound, and an aromatic dicarboxylic acid compound.

Although terephthalic acid (PTA) used as an example of the aromatic dicarboxylic acid compound in the present invention is cheaper than dimethyl terephthalate (DMT) typically used as an aromatic monomer, the terephthalic acid requires a temperature of 210° C. or more to induce a uniform esterification reaction with an aliphatic dihydroxy compound unlike the dimethyl terephthalate which can react even at a temperature of 200° C. or less.

However, 1,4-butanediol (BDO) used as an example of the aliphatic dihydroxy compound in the present invention is easily converted into tetrahydrofuran (THF) at a temperature of 200° C. or more under acidic conditions. Therefore, if terephthalic acid is used as an aromatic monomer, the aliphatic dihydroxy compound in an excessive equivalent weight of 1.7 to 2.5 to the total equivalent weight of dicarboxylic acid needs to be used.

In the present invention, there is used a method of first performing a reaction and incorporation of the aliphatic dihydroxy compound with the aliphatic dicarboxylic acid compound which can react at a relatively low temperature in order to prevent side reaction of the aliphatic dihydroxy compound and improve a solubility of the aromatic dicarboxylic acid compound.

Further, in the present invention, together with the method of first performing a reaction and incorporation of the aliphatic dihydroxy compound with the aliphatic dicarboxylic acid compound, there is used a method of dividedly adding the aromatic dicarboxylic acid compound in stages instead of adding the aromatic dicarboxylic acid compound at once, so that a solubility of the aromatic dicarboxylic acid compound can effectively be increased and thus a side reaction can be reduced without a delay in an esterification reaction.

To be more specific, the present invention provides a method of preparation for a biodegradable co-polyester, including: forming an oligomer through a primary esterification reaction between an aliphatic dihydroxy compound and an aliphatic dicarboxylic acid compound; performing a secondary esterification reaction between the formed oligomer and an aromatic dicarboxylic acid compound; and performing a polycondensation reaction in a vacuum, wherein sequentially divided addition of the aromatic dicarboxylic acid compound is performed during the secondary esterification reaction.

Any aliphatic dihydroxy compound can be used as the aliphatic dihydroxy compound of the present invention without limit as long as it can be used as a starting material in a process of preparation for a biodegradable aliphatic-aromatic polyester resin. Particularly, an aliphatic dihydroxy compound likely to be wasted in a reaction at a high temperature under acidic conditions can usefully be used. To be specific, it is preferable to use diol having 2 to 6 carbon atoms, such as 1,2-ethanediol, 1,3-propanediol, 1,2-butanediol, 1,6-hexanediol, 1,4-hexanediol, 1,4-butanediol, neopentyl glycol, isosorbide, or combinations thereof. Particularly, it is preferable to use 1,4-butanediol. A cycloaliphatic dihydroxy compound such as 1,4-cyclohexanediol or 1,4-cyclohexanedimethyanol may be used.

Any aliphatic dicarboxylic acid compound may be used without limit as the aliphatic dicarboxylic acid compound which reacts with the aliphatic dihydroxy compound as long as it can make an esterification reaction with an aliphatic dihydroxy compound as a reaction of a low temperature to form an oligomer, so that the amount of the aliphatic dicarboxylic acid compound wasted at a high temperature under acidic conditions can be minimized.

According to an example of the present invention, the aliphatic dicarboxylic acid compound may be a compound represented by the following Chemical Formula 1, or an anhydride or derivative thereof:

[Chemical Formula 1]

(where n is 2 to 12, and preferably, n is 2 to 8.)

By way of specific example, succinic acid, glutaric acid, adipic acid, sebacic acid, or anhydrides or derivatives thereof may be used as the aliphatic dicarboxylic acid compound.

Two carboxylic acids contained in the aliphatic dicarboxylic acid compound make an esterification reaction with a hydroxyl group contained in the aliphatic dihydroxy compound. In this case, by adjusting an equivalent weight of the aliphatic dicarboxylic acid compound with respect to the aliphatic dihydroxy compound, one aliphatic dihydroxy compound may be bonded and incorporated with one aliphatic dicarboxylic acid compound, or two aliphatic dihydroxy compounds may be bonded and incorporated therewith.

To be specific, 1,4-butanediol used as an example of the aliphatic dihydroxy compound in the present invention reacts with adipic acid so as to form an AA-BDO oligomer type or a BDO-AA-BDO oligomer type.

Even if 1,4-butanediol further reacts with the aromatic dicarboxylic acid compound at a high temperature under acidic conditions after the reaction with adipic acid to form an oligomer, the amount of 1,4-butanediol converted into tetrahydrofuran can be minimized.

The primary esterification reaction between the aliphatic dihydroxy compound and the aliphatic dicarboxylic acid compound is ended at the time when the amount of water produced from the esterification reaction reaches a theoretically calculated amount (that is, the amount of water corresponding to the total mol number of carboxylic acid contained in the aliphatic dicarboxylic acid compound).

The primary esterification reaction may be performed at a temperature in the range of, preferably, from 160° C. to 220° C., and more preferably, from 170° C. to 200° C. The secondary esterification reaction which is performed at a higher temperature than the primary esterification reaction may be performed at a temperature in the range of, preferably, from 210° C. to 260° C., and more preferably, from 220° C. to 250° C.

To be specific, if terephthalic acid (PTA) is used as the aromatic dicarboxylic acid compound, an esterification reaction is uniformly performed at a temperature of 220° C. or more. Therefore, it is preferable to perform the secondary esterification reaction at a temperature in the range of from 220° C. to 260° C.

In the present invention, the aromatic dicarboxylic acid compound used in the secondary esterification reaction may be selected from, but not limited to, phthalic acid (PA), phthalic anhydride, isophthalic acid (IPA), terephthalic acid (PTA), or naphthalene-2,6-dicarboxylic acid. As an aromatic monomer used to improve a mechanical property of a biodegradable aliphatic polyester resin, an aromatic dicarboxylic acid compound may usefully be used as long as it can induce an esterification reaction with an aliphatic dihydroxy compound particularly at a high temperature.

When the aromatic dicarboxylic acid compound is added to the oligomer of the aliphatic dihydroxy compound and the aliphatic dicarboxylic acid compound, in case of the aromatic dicarboxylic acid compound being added at once, it is not completely dissolved due to its low solubility. Therefore, an esterification reaction competes with a side reaction. Accordingly, the esterification reaction is delayed and the side reaction is accelerated.

In order to solve such a problem, the aromatic dicarboxylic acid compound is not added at once to the oligomer of the aliphatic dihydroxy compound and the aliphatic dicarboxylic acid compound but dividedly added several times at a certain ratio. To be specific, if terephthalic acid (PTA) is used as an aromatic dicarboxylic acid compound, the terephthalic acid is allowed to react with an oligomer formed through a primary esterification reaction between 1,4-butanediol (BDO) and adipic acid (AA). The weight ratio of the terephthalic acid with respect to the oligomer is from 2:8 to 5:5, preferably 3:7.

Then, the terephthalic acid is further added dividedly at a certain ratio one to five more times, that is, two to six times in total, and preferably, four times in total. Herein, the terephthalic acid may be added at the same ratio for each time of the divided addition, or may be added at an increasing ratio or a decreasing ratio, but preferably, at the same ratio.

If the aromatic dicarboxylic acid compound is dividedly added, the aromatic dicarboxylic acid compound may be added at intervals of 15 minutes to 30 minutes, and preferably, may be added at the time when the previously added terephthalic acid (PTA) is completely dissolved.

The amount of the aliphatic dihydroxy compound used may be in the range required for a target esterification reaction. The aliphatic dihydroxy compound of 1.0 mol or more may be added to the aliphatic dicarboxylic acid compound and the aromatic dicarboxylic acid compound in the total mol of 1 mol, and preferably, the aliphatic dihydroxy compound of 1.3 mol or more may be added. However, in the present invention, by dividedly adding the aromatic dicarboxylic acid compound, a side reaction of the aliphatic dihydroxy compound is reduced, so that the amount of the aliphatic dihydroxy compound added can be reduced. It is preferable to use the aliphatic dicarboxylic acid compound and the aromatic dicarboxylic acid compound at a mol ratio of 0.55 to 0.5:0.45 to 0.5, for example, at a mol ratio of 0.52:0.48 in terms of biodegradability. If biodegradability is not required, the aliphatic dicarboxylic acid compound and the aromatic dicarboxylic acid compound may react with each other at various mol ratios.

The primary and secondary reactions may be performed batch-wise or continuously under normal pressure.

According to the present invention, after an aliphatic-aromatic co-polyester is obtained through the first and second reactions, the following polycondensation reaction or a chain extending reaction is performed to increase a molecular weight. Thus, a biodegradable resin having required properties can be obtained.

In the present invention, preferably, the polycondensation reaction may be performed to the aliphatic-aromatic co-polyester obtained through the primary and secondary reactions at a vacuum level of less than 2 torr and a temperature ranging from 220° C. to 260° C. for 40 minutes to 300 minutes.

The polycondensation reaction is used to induce a reaction between polymers that the oligomer produced through the primary and secondary reactions or do not have a desirable molecular weight. In order to do so, the polycondensation reaction needs to be performed with a functional group that does not react but remains at an end of the polymer or at a chain of the polymer. Therefore, the polycondensation reaction is performed in a vacuum at a high temperature. A reaction time of the polycondensation reaction may be adjusted depending on the amount of a catalyst and a method of adding the catalyst to be described later.

Further, in the present invention, there may be performed a chain extending reaction in which a chain extender is added and reacted to connect two or more polycondensated aliphatic-aromatic co-polyesters obtained through the primary and secondary reactions. The chain extending reaction has been publicly known and may be performed using one or more kinds selected from, for example, the group consisting of 2,4-toluene diisocyanate, 2,6-toluene diisocyanate, diphenylmethane diisocyanate, xylylene diisocyanate, 1,5-naphthylene diisocyanate, hexamethylene diisocyanate, and triphenylmethane triisocyanate, and preferably, using hexamethylene diisocyanate in the amount of 0.05 parts by weight to 2 parts by weight with respect to the copolymer.

In the primary reaction, the secondary reaction, the polycondensation reaction, and the chain extending reaction of the present invention, a compound (a branching agent) having a functional group of trivalence or more can be selectively added arbitrarily for a branching reaction, so that a molecular weight can be increased and a polymer having a branching structure can be prepared.

The branching agent may include one or more multifunctional compounds selected from the group consisting of multivalent alcohol having three or more functional groups, multivalent carboxylic acid having three or more functional groups or anhydride thereof, and hydroxyl carboxylic acid having three or more functional groups. Preferably, the amount of the branching agent used may be 0.1 g to 3 g with respect to 1 mol of the aliphatic dicarboxylic acid compound and the aromatic dicarboxylic acid compound.

In the present invention, whether or not the branching agent is used or the amount of the branching amount used is a factor that significantly influences properties of a biodegradable resin shown as a melt flow index or the like. Therefore, in the present invention, whether or not the branching agent is used and the amount of the branching agent used are determined at each reaction of preparation for a resin as one means for adjusting properties of the resin. Further, in the present invention, a catalyst or a thermal stabilizer may be used to improve efficiency of the above-described reactions by accelerating and stabilizing the reactions.

As the catalyst, calcium acetate, manganese acetate, magnesium acetate, zinc acetate, monobutyltin oxide, dibutyltin oxide, monobutyl hydroxy tin oxide, octyltin, dibutyltin dichloride, tetraphenyltin, tetrabutyltin, tetrabutyl titanate, tetramethyl titanate, tetraisopropyl titanate, and tetra(2-ethylhexyl)titanate may be used. Preferably, tetrabutyl titanate $(Ti(OC_4H_9)_4)$ or an organic titanium catalyst such as Vertec®VEXP 0641 (titanium type catalyst, Johnson Matthey) may be used. Desirably, the amount of the catalyst used may be 0.1 g to 1.5 g with respect to 1 mol of the aliphatic dicarboxylic acid compound and the aromatic dicarboxylic acid compound.

As the thermal stabilizer, a phosphorous compound such as triphenyl phosphate or trimethyl phosphate may further be added to react. The phosphorous compound acts for stably maintaining a reaction by preventing thermal decomposition while a molecular weight is increased at a high temperature.

Hereinafter, the present invention will be described in detail with reference to Examples. However, it is clear that Examples are only provided for easy understanding of the present invention, but the present invention is not limited to Examples.

EXAMPLE 1

1.3 mol of 1,4-butanediol (BDO), 0.52 mol of adipic acid (AA), 0.3 g of tetrabutyl titanate, 0.1 g of triphenyl phosphate, and glycerin as a branching agent in an amount of 1.7% by weight with respect to the weight of the adipic acid were mixed in a 500 ml reactor connected to a stirrer, a thermometer, and a vacuum pump and provided with a condenser including a thermometer at its upper part, and then a temperature of the reactor increased. A primary esterification reaction was performed at 200° C. The primary esterification reaction was performed for 77 minutes.

Then, 0.12 mol of terephthalic acid (PTA) was added into the reactor for the first time and a temperature of the reactor increased. A secondary reaction was performed at 230° C. After 15 minutes, 0.12 mol of terephthalic acid (PTA) was further added for the second time and the reaction was performed at 240° C. Again after 15 minutes, 0.12 mol of terephthalic acid (PTA) was further added for the third time and the reaction was performed at 240° C. Finally, after 15 minutes, 0.12 mol of terephthalic acid (PTA) was further added for the fourth time and the reaction was performed at 240° C. The reaction was ended at the time when a temperature at the upper part of the condenser of the reactor decreased to 90° C. or less. The secondary esterification reaction was performed for 92 minutes.

Thereafter, a polycondensation reaction was performed to an intermediate product obtained from the primary and secondary reactions at a temperature of 240° C. and a vacuum level of less than 1 torr for 135 minutes. As a result, a biodegradable resin was obtained.

EXAMPLE 2

A biodegradable resin was obtained by performing reactions in the same manner as Example 1, except that 1.04 mol of AA was added into a 1 L reactor connected to a stirrer, a thermometer, and a vacuum pump and provided with a condenser including a thermometer at its upper part, 0.24 mol of PTA was added into the reactor four times in total, resulting in the total reaction of 2 mol, 2.6 mol of 1,4-butanediol was added thereto, and the amount of tetrabutyl titanate and triphenyl phosphate used was increased two times.

EXAMPLE 3

A biodegradable resin was obtained by performing reactions in the same manner as Example 1, except that 15.6 mol of AA was added into a 20 L reactor connected to a stirrer, a thermometer, and a vacuum pump and provided with a condenser including a thermometer at its upper part, 3.6 mol of PTA was added into the reactor four times in total, resulting in the total reaction of 30 mol, 39 mol of 1,4-butanediol was added thereto, and the amount of tetrabutyl titanate and triphenyl phosphate used was increased thirty times.

EXAMPLE 4

The polymer prepared in Example 3 was put into a high-temperature vacuum drier and vacuum-dried at 20 torr or less and 80° C. for 4 hours or more. 40 mg of hexamethylene diisocyanate as a chain extender was added to 200 g of the polymer thus obtained. Further, 40 mg of an antioxidant (tetrakis[methylene(3,5-di-t-butyl-4-hydroxyhydrocinnamate)] methane, A0-60) and 40 mg of wax (ethylene bis-stearamide, EBS) were added and mixed. A reaction was performed while performing extrusion at 170° C. As a result, a final biodegradable resin was obtained.

COMPARATIVE EXAMPLE 1

1.3 mol of 1,4-butanediol, 0.52 mol of adipic acid, 0.4 g of tetrabutyl titanate, 0.1 g of triphenyl phosphate, and glycerin as a branching agent in an amount of 1.7% by weight with respect to the weight of the adipic acid were mixed in a 500 ml reactor connected to a stirrer, a thermometer, and a vacuum pump and provided with a condenser including a thermometer at its upper part, and then a temperature of the reactor increased. A primary esterification reaction was performed at 200° C. The primary esterification reaction was performed for 77 minutes.

Then, 0.48 mol of terephthalic acid was added into the reactor and a temperature of the reactor increased. A secondary esterification reaction was performed at 240° C. The reaction was ended at the time when a temperature at the upper part of the condenser of the reactor decreased to 90° C. or less. The secondary esterification reaction was performed for 98 minutes.

Thereafter, a polycondensation reaction was performed to a product obtained from the primary and secondary reactions at a temperature of 240° C. and a vacuum level of less than 1 torr for 135 minutes. As a result, a biodegradable resin was obtained.

COMPARATIVE EXAMPLE 2

A biodegradable resin was obtained by performing reactions in the same manner as Comparative Example 1, except that 1.04 mol of AA was added into a 1 L reactor connected to a stirrer, a thermometer, and a vacuum pump and provided with a condenser including a thermometer at its upper part, 0.96 mol of PTA was added into the reactor, resulting in the total reaction of 2 mol, 2.6 mol of 1,4-butanediol was added thereto, and the amount of tetrabutyl titanate and triphenyl phosphate used was increased two times.

COMPARATIVE EXAMPLE 3

A biodegradable resin was obtained by performing reactions in the same manner as Comparative Example 1, except that 15.60 mol of AA was added into a 20 L reactor connected to a stirrer, a thermometer, and a vacuum pump and provided with a condenser including a thermometer at its upper part, 14.40 mol of PTA was added into the reactor, resulting in the total reaction of 30 mol, 39 mol of 1,4-butanediol was added thereto, and the amount of tetrabutyl titanate and triphenyl phosphate used was increased thirty times.

COMPARATIVE EXAMPLE 4

39 mol of 1,4-butanediol, 15.6 mol of adipic acid, 14.4 mol of terephthalic acid, 0.3 g of tetrabutyl titanate, 0.1 g of triphenyl phosphate, and glycerin as a branching agent in an amount of 1.7% by weight with respect to the weight of the adipic acid were added into a reactor at the same time, and a temperature of the reactor increased. A primary esterification reaction was performed at 200° C. Then, the temperature of the reactor increased, and a secondary esterification reaction was performed at 240° C. The total reaction time was 205 minutes to 220 minutes. After completing the secondary reaction, a polycondensation reaction was performed at a temperature of 240° C. and a vacuum level of less than 1 torr for 135 minutes. As a result, a biodegradable resin was obtained.

EXPERIMENTAL EXAMPLE 1

THF Conversion Rate

A conversion rate of 1,4-butanediol (BDO) used in Examples 1 to 3 and Comparative Examples 1 to 4 and primary and secondary esterification reaction times were measured. The results are shown in the following Table 1.

Measurement of THF conversion rate: THF contained in discharged water was quantitatively measured using a gas chromatography (GC).

TABLE 1

| division | Total reaction mol number (M) | Esterification reaction Primary reaction Oligo- mer | Time (min) | Secondary reaction Added substance, Number of addition | Time (min) | THF conversion rate (mol %) |
|---|---|---|---|---|---|---|
| Example 1 | 1 | AA-BDO | 77 | PTA, 4 times | 92 | 11.60 |
| Example 2 | 2 | AA-BDO | 77 | PTA, 4 times | 92 | 12.47 |
| Example 3 | 30 | AA-BDO | 77 | PTA, 4 times | 98 | 13.10 |
| Comparative Example 1 | 1 | AA-BDO | 77 | PTA, 1 time | 98 | 17.14 |
| Comparative Example 2 | 2 | AA-BDO | 77 | PTA, 1 time | 110 | 19.19 |
| Comparative Example 3 | 30 | AA-BDO | 77 | PTA, 1 time | 135 | 30.07 |
| Comparative Example 4 | 30 | AA, BDO, PTA added at the same time | | | | 29.52 |

Property of Biodegradable Resin

Acid values and molecular weights of biodegradable resins obtained from Examples 1 to 4 and Comparative Examples 1 to 4 were measured. The results are shown in the following Table 2.

Measurement of molecular weight: A resin-chloroform solution of 0.1% by weight was prepared, and a molecular weight was measured at a flow velocity of 1 ml/min and 35° C. using a GPC (Gel Permeation Chromatography)(Agilent 1200 Infinity Series).

Measurement of acid value: 0.5 g of a resin was dissolved in 20 ml of chloroform, and then ethanol was added to the resulting solution. The solution was titrated and measured by an Autotitrator, and then an acid value was calculated.

TABLE 2

| | Product | |
|---|---|---|
| Division | Acid value mg KOH/gr | Molecular weight (Mw) |
| Example 1 | 1.5 | 155,000 |
| Example 2 | 1.8 | 154,000 |
| Example 3 | 1.9 | 156,000 |
| Example 4 | 1.95 | 166,000 |
| Comparative Example 1 | 2.5 | 143,000 |
| Comparative Example 2 | 3.2 | 135,000 |
| Comparative Example 3 | 4.6 | 105,000 |
| Comparative Example 4 | 4.5 | 108,000 |

As can be seen from Table 1 and Table 2, the biodegradable co-polyester according to the present invention has a relatively low THF conversion rate of 1,4-butanediol, and thus a secondary esterification reaction requires a relatively short reaction time. Therefore, non-reacted terephthalic acid or partially reacted terephthalic acid is reduced, and thus an acid value is 2.0 mg KOH/gr or less that is relatively lower than acid values of Comparative Examples. Accordingly, it can be seen that a hydrolysis resistance is excellent and a molecular weight is 150,000 or more. Further, although the biodegradable co-polyester of the present invention uses 1,4-butanediol in the same amount as Comparative Example, the acid value can be low. Therefore, it can be seen that the biodegradable co-polyester does not need to use an excessive amount of 1,4-butanediol and is excellent in terms of productivity.

The present invention of preparation for a biodegradable co-polyester by performing sequentially divided addition of an aromatic dicarboxylic acid compound to an oligomer formed by first performing a reaction between an aliphatic dihydroxy compound and an aliphatic dicarboxylic acid compound has the following effects.

Firstly, according to the present invention, a solubility of an aromatic dicarboxylic acid compound dividedly added to an oligomer formed by first performing a reaction between an aliphatic dihydroxy compound and an aliphatic dicarboxylic acid compound can be efficiently increased, and thus a side reaction can be reduced without a delay in an esterification reaction.

Secondly, a non-reacted aromatic dicarboxylic acid compound or a partially reacted aromatic dicarboxylic acid compound affecting an acid value of the co-polyester can efficiently be reduced during the reaction, and thus it is possible to reduce an acid value of a product, improve stability against aging, and improve a hydrolysis resistance.

Thirdly, the use of an expensive aliphatic dihydroxy compound can be reduced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of preparation for a biodegradable co-polyester, the method comprising:
    forming an oligomer through a primary esterification reaction between an aliphatic dihydroxy compound and an aliphatic dicarboxylic acid compound;
    performing a secondary esterification reaction between the formed oligomer and an aromatic dicarboxylic acid compound; and
    performing a polycondensation reaction in a vacuum,
    wherein sequentially divided addition of the aromatic dicarboxylic acid compound is performed and the weight ratio of the aromatic dicarboxylic acid compound with respect to the oligomer for each time of the sequentially divided addition is from 2:8 to 5:5.

2. The method of claim 1, wherein the sequentially divided addition is two-time to six-time divided addition.

3. The method of claim 1, wherein the aromatic dicarboxylic acid compound is added at the same ratio for each time of the sequentially divided addition.

4. The method of claim 1, wherein the aliphatic dihydroxy compound is selected from the group consisting of 1,2-ethanediol, 1,3-propanediol, 1,2-butanediol, 1,6-hexanediol, 1,4-hexanediol, 1,4-butanediol, neopentyl glycol, isosorbide, and combinations thereof.

5. The method of claim 1, wherein instead of the aliphatic dihydroxy compound, a cycloaliphatic dihydroxy compound selected from 1,4-cyclohexanediol or 1,4-cyclohexanedimethanol is used.

6. The method of claim 1, wherein the aliphatic dicarboxylic acid compound is a compound represented by the following Chemical Formula 1, or an anhydride or derivative thereof:

$$\text{HOOC}-(\text{CH}_2)_n-\text{COOH} \qquad \text{[Chemical Formula 1]}$$

(where n is 2 to 12.)

7. The method of claim 1, wherein the aromatic dicarboxylic acid compound includes one or more kinds selected from the group consisting of phthalic acid (PA), phthalic anhydride, isophthalic acid (IPA), terephthalic acid (PTA), and naphthalene-2,6-dicarboxylic acid.

8. The method of claim 1, wherein the primary esterification reaction is first performed at a temperature ranging from 160° C. to 220° C. and the secondary esterification reaction is performed in sequence at a temperature ranging from 210° C. to 260° C.

9. The method of claim 1, wherein the polycondensation reaction is performed at a temperature ranging from 220° C. to 260° C. and a vacuum level of less than 2 torr for 40 minutes to 300 minutes.

10. The method of claim 9, further comprising adding and allowing a chain extender to react after the polycondensation reaction.

11. The method of claim 1, further comprising adding and allowing a branching agent to react during the preparation for the biodegradable co-polyester.

* * * * *